United States Patent
Chen et al.

(10) Patent No.: US 10,200,985 B2
(45) Date of Patent: Feb. 5, 2019

(54) METHODS AND APPARATUS FOR MANAGING CONTROL AND DATA TRANSMISSIONS FOR LOW COST USER EQUIPMENTS

(71) Applicant: QUALCOMM Incorporated, San Diego, CA (US)

(72) Inventors: Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/360,217

(22) Filed: Nov. 23, 2016

(65) Prior Publication Data
US 2017/0079021 A1   Mar. 16, 2017

Related U.S. Application Data

(62) Division of application No. 13/874,259, filed on Apr. 30, 2013, now Pat. No. 9,538,502.
(Continued)

(51) Int. Cl.
*H04W 72/04*    (2009.01)
*H04L 5/00*    (2006.01)

(52) U.S. Cl.
CPC ......... *H04W 72/042* (2013.01); *H04L 5/0053* (2013.01); *H04L 5/0094* (2013.01);
(Continued)

(58) Field of Classification Search
None
See application file for complete search history.

(56) References Cited

U.S. PATENT DOCUMENTS 9,538,502 B2    1/2017    Chen et al.
2011/0064037 A1*  3/2011  Wei ............... H04W 72/1289
                                                    370/329
(Continued)

FOREIGN PATENT DOCUMENTS

CN    101601208 A    12/2009
CN    102318228 A    1/2012
(Continued)

OTHER PUBLICATIONS

ITRI: "BCH load reduction by sharing with DL-SCH," R2-061247, 3GPP TSG RAN WG2 Meeting #53,Shanghai, China, May 8, 2006, XP002488778, Retrieved from the Internet: URL:http://www.3gpp.org/ftp/Specs/html-info/TDocExMtg—R2-53--25411.htm, [retrieved on Jul. 17, 2008].

(Continued)

Primary Examiner — Mohammad S Adhami
(74) Attorney, Agent, or Firm — Patterson & Sheridan, LLP

(57) ABSTRACT

Certain aspects of the present disclosure relate to methods and apparatus for managing control and data transmissions for low cost UEs. In certain aspects, multiplexing of a control channel and data channel may be allowed in a Physical Resource Block (PRB) pair of a subframe. An indication may be provided to the UE regarding whether a portion of resources of the PRB pair not used to transmit the control channel is available for transmitting the data channel. In alternative aspects, control and data may be scheduled in different subframes, such that there is no need to multiplex them in a subframe or a PRB pair in a same subframe.

36 Claims, 13 Drawing Sheets

Related U.S. Application Data

(60) Provisional application No. 61/640,798, filed on May 1, 2012.

(52) U.S. Cl.
CPC ......... *H04W 72/04* (2013.01); *H04W 72/048* (2013.01); *H04W 72/0453* (2013.01); *H04L 5/0007* (2013.01); *H04W 72/0406* (2013.01)

(56) References Cited

U.S. PATENT DOCUMENTS

| | | | |
|---|---|---|---|
| 2011/0075624 A1* | 3/2011 | Papasakellariou | .... H04L 5/0053 370/329 |
| 2011/0206147 A1 | 8/2011 | Hariharan et al. | |
| 2011/0255484 A1* | 10/2011 | Zhang | ...................... H04L 5/001 370/329 |
| 2012/0008574 A1 | 1/2012 | Xiao et al. | |
| 2012/0051270 A1 | 3/2012 | Chen et al. | |
| 2012/0120868 A1 | 5/2012 | Park et al. | |
| 2012/0320883 A1 | 12/2012 | Seo et al. | |
| 2013/0044693 A1* | 2/2013 | Lindh | ................... H04L 5/0026 370/329 |
| 2013/0088985 A1 | 4/2013 | Park et al. | |
| 2013/0188566 A1 | 7/2013 | Zhu et al. | |
| 2013/0201926 A1 | 8/2013 | Nam et al. | |
| 2013/0230017 A1 | 9/2013 | Papasakellariou et al. | |
| 2013/0242904 A1 | 9/2013 | Sartori et al. | |
| 2013/0242947 A1 | 9/2013 | Chen et al. | |
| 2014/0192759 A1* | 7/2014 | Son | ................... H04W 72/0426 370/329 |
| 2014/0241298 A1 | 8/2014 | Park et al. | |

FOREIGN PATENT DOCUMENTS

| | | |
|---|---|---|
| WO | 2011142641 A2 | 11/2011 |
| WO | WO-2013023621 A1 | 2/2013 |

OTHER PUBLICATIONS

CATT: "Considerations on E-PDCCH multiplexing with PDSCH", 3GPP Draft; R1-120110, 3rd Generation Partnership Project (3GPP), Mobile Competence Centre ; 650, Route Des Lucioles ; F-06921 Sophia-Antipolis Cedex ; France, vol. RAN WG1, no. Dresden, Germany; Feb. 6, 2012-Feb. 10, 2012, Jan. 31, 2012 (Jan. 31, 2012), XP050562690, [retrieved on Jan. 31, 2012].
European Search Report—EP16150165—Search Authority—Munich—dated Apr. 29, 2016.
HTC: "E-PDCCH Design Considerations on Multiplexing with PDSCH", 3GPP Draft; R1-114354 E-PDCCH Design Aspects, 3rd Generation Partnership Project (3GPP), Mobile Competence Centre, 650, Route Des Lucioles; F-06921 Sophia-Antipolis Cedex; France, vol. RAN WG1, no. San Francisco, USA; Nov. 14, 2011-Nov. 18, 2011, Nov. 21, 2011 (Nov. 21, 2011), XP050562464, [retrieved on Nov. 21, 2011] Y p. 1, lines 19-20 p. 2, lines 32-37 figures 3,4.
HTC: "E-PDCCH Design Considerations on Multiplexing with PDSCH", 3GPP Draft; R1-120266, 3rd Generation Partnership Project (3GPP), Mobile Competence Centre ; 650, Route Des Lucioles ; F-06921 Sophia-Antipolis Cedex ; France, vol. RAN WG1, no. Dresden, Germany; Feb. 6, 2012-Feb. 10, 2012 (Feb. 1, 2012), XP050563176, [retrieved on Feb. 1, 2012].
Intel Corporation: "Performance evaluation of cost reduction strategies for low-cost MTC UEs based on LTE", 3GPP Draft; R1-120210, 3rd Generation Partnership Project (3GPP), Mobile Competence Centre; 650, Route Des Lucioles; F-06921 Sophia-Antipolis Cedex; France, vol. RAN WG1, no. Dresden, Germany; Feb. 6, 2012-Feb. 12, 2012, Feb. 1, 2012 (Feb. 1, 2012), XP050563169.
Interdigital Communications et al., "On ePDCCH Multiplexing", 3GPP Draft; R1-121319 EPDCCH Multiplexing Final, 3rd Generation Partnership Project (3GPP), Mobile Competence Centre; 650, Route Des Lucioles; F-06921 Sophia-Antipolis Cedex , France, vol. RAN WG1, no. Jeju, Korea; Mar. 26, 2012-Mar. 30, 2012, Mar. 20, 2012 (Mar. 20, 2012), XP050599609, [retrieved on Mar. 20, 2012] p. 1, line 1—p. 3, line 5 figures 1,2.
International Search Report and Written Opinion—PCT/US2013/039000—ISA/EPO—dated Oct. 31, 2013.
LG Electronics: "Multiplexing PDSCH and E-PDCCH within a PRB pair", 3GPP Draft; R1-120449, 3rd Generation Partnership Project (3GPP), Mobile Competence Centre; 650, Route Des Lucioles; F-06921 Sophia-Antipolis Cedex; France, vol. RAN WG1, no. Dresden, Germany; Feb. 6, 2012-Feb. 10, 2012, Jan. 31, 2012 (Jan. 31, 2012), XP050562937, [retrieved on Jan. 31, 2012] Y p. 1, line 1—p. 2, line 18 figures 1,2.
Motorola Mobility: "E-PDCCH Design Aspects", 3GPP Draft; R1-114029—Enhanced PDCCH Design Aspects_F, 3rd Generation Partnership Project (3GPP), Mobile Competence Centre ; 650, Route Des Lucioles; F-06921 Sophia-Antipolis Cedex; France, vol. RAN WG1, no. San Francisco, USA; Nov. 14, 2011-Nov. 18, 2011, Nov. 10, 2011 (Nov. 10, 2011), XP050562396, [retrieved on Nov. 10, 2011] figure 2.
NEC Group: "Maximum Bandwidth Reduction for Low-Cost MTC UE based on LTE", 3GPP Draft; R1-120259, 3rd Generation Partnership Project (3GPP), Mobile Competence Centre, 650, Route Des Lucioles, F-06921 Sophia-Antipolis Cedex, France, vol. RAN WG1, no. Dresden, Germany, Feb. 6, 2012-Feb. 10, 2012, Jan. 31, 2012 (Jan. 31, 2012), 6 Pages, XP050562813, title section 2.2 Bandwidth sharing.
Panasonic: "Multiplexing between ePDCCH and PDSCH", 3GPP Draft; R1-120235, 3rd Generation Partnership Project (3GPP), Mobile Competence Centre; 650, Route Des Lucioles; F-06921 Sophia-Antipolis Cedex , France, vol. RAN WG1, no. Dresden, Germany; Feb. 6, 2012-Feb. 10, 2012, Jan. 31, 2012 (Jan. 31, 2012), XP050562792, [retrieved on Jan. 31, 2012] p. 2, Lines 13,14,24-31 Figure 1 table 1.
Partial International Search Report—PCT/US2013/039000—ISA/EPO—dated Sep. 13, 2013.
Qualcomm Incorporated: "Additional Comments on Cost Evaluation for MTC", 3GPP Draft; R1-122804 Additional Comments on Cost Evaluation for MTC, 3rd Generation Partnership Project (3GPP), Mobile Competence Centre ; 650, Route Des Lucioles ; F-06921 Sophia-Antipolis Cedex , France, vol. RAN WG1, no. Prague, Czech Republic; May 21, 2012-May 25, 2012, May 12, 2012 (May 12, 2012), pp. 1-3, XP050600981, [retrieved on May 12, 2012] p. 2, line 8—p. 3, line 4 figures 1.2.
Qualcomm Incorporated: "Downlink transmission modes for MTC". 3GPP Draft; R1-122802 Downlink Transmission Modes for MTC. 3rd Generation Partnership Project (3GPP). Mobile Competence Centre; 650. Route Des Lucioles ; F-06921 Sophia-Antipolis Cedex; France. val. RAN WG1. no. Prague Czech Republic; May 21, 2012-May 25, 2012. May 12, 2012 (May 12, 2012). XP050600980. [retrieved on May 12, 2012].
Qualcomm Incorporated: "Impact of Reduction of Maximun Bandwith on MTC", 3GPP Draft; R1-120563 Impact of Reduction of Maximum BW for MTC, 3rd Generation Partnership Project (3GPP), Mobile Competence Centre; 650 Route Des Lucioles; F-06921 Sophia-Antipolis Cedex; France, vol. RAN WG1, no. Dresden, Germany; Feb. 6, 2012-Feb. 10, 2012, Jan. 31, 2012 (Jan. 31, 2012), XP05063001, [retrieved on Jan. 31, 2012] A the whole document
Qualcomm Incorporated: "Indication to the UE of ePDCCH PRB Pairs", 3GPP Draft; R1-123697 Indication to the UE of EPDCCH PRB Pairs, 3rd Generation Partnership Project (3GPP), vol. RAN WG1, no. Qingdao, China; Aug. 13, 2012-Aug. 17, 2012 Aug. 5, 2012 (Aug. 5, 2012), XP050661571, Retreived from the Internet: URL: http://www.3gpp.org/ftp/tsg_ran/WG1_RL1/TSGR1_70/Docs/ [retrieved on Aug. 5, 2012] the whole document.
Qualcomm Incorporated: "Multiplexing e-PDCCH with PDSCH", 3GPP Draft; R1-114124 Multiplexing EPDCCH With PDSCH, 3rd Generation Partnership Project (3GPP), Mobile Competence Centre; 650, Route Des Lucioles ; F-06921 Sophia-Antipolis Cedex; France, vol. RAN WG1, no. San Francisco, USA; Nov. 14, 2011-Nov. 18, 2011, Nov. 8, 2011 (Nov. 8, 2011), XP050562099, [retrieved on Nov. 8, 2011] the whole document.

(56) References Cited

OTHER PUBLICATIONS

Qualcomm Incorporated: "Multiplexing of different DCI messages for e-PDCCH", 3GPP Draft; R1-120562 Multiplexing of Different DCI Messages for E-PDCCH, 3rd Generation Partnership Project (3GPP), Mobile Competence Centre; 650, Route Des Lucioles; F-06921 Sophia-Antipolis Cedex; France, vol. RAN WG1, no. Dresden, Germany; Feb. 6, 2012-Feb. 10, 2012, Jan. 31, 2012 (Jan. 31, 2012), XP050563000, [retrieved on Jan. 31, 2012] the whole document.

Qualcomm Incorporated: "On cross-carrier scheduling with EPDCCH", 3GPP Draft; R1-125112 on Cross-Carrier Scheduling With EPDCCH, 3rd Generation Partnership Project (3GPP), Mobile Competence Centre; 650, Route Des Lucioles; F-06921 Sophia-Antipolis Cedex; France vol. RAN WG1, no. New Orleans, USA; Nov. 12, 2012-Nov. 16, 2012 Nov. 3, 2012 (Nov. 3, 2012), XP050662973, [retrieved on Nov. 3, 2012] the whole document.

Qualcomm Incorporated: "Remaining details of search space and aggregation levels", 3GPP Draft; R1-125107 Remaining Details of Search Space and Aggregation Levels, 3rd Generation Partnership Project (3GPP), Mobile Competence Centre ; 650, Route Des Lucioles ; F-06921 Sophia-Antipolis, vol. RAN WG1, no. New Orleans, USA; Nov. 12, 2012-Nov. 16, 2012 Nov. 3, 2012 (Nov. 3, 2012), XP050662968, Retrieved from the Internet: URL: http://www.3gpp.org/ftp/tsg_ran/WG1_RL1/TSGR1_71/Docs/ [retrieved on Nov. 3, 2012] the whole document.

Samsung: "Discussion on ePDCCH Design Issues", 3GPP Draft; R1-112517 EPDCCH, 3rd Generation Partnership Project (3GPP), Mobile Competence Centre ; 650, Route Des Lucioles ; F-06921 Sophia-Antipolis Cedex ; France, vol. RAN WG1, no. Athens, Greece, Aug. 22, 2011, Aug. 16, 2011, XP050537597 , [retrieved on Aug. 16, 2011].

\* cited by examiner

METHODS AND APPARATUS FOR MANAGING CONTROL AND DATA TRANSMISSIONS FOR LOW COST USER EQUIPMENTS

CLAIM OF PRIORITY UNDER 35 U.S.C. § 119

The present Application for Patent is a divisional application of U.S. patent application Ser. No. 13/874,259, entitled "METHODS AND APPARATUS FOR MANAGING CONTROL AND DATA TRANSMISSIONS FOR LOW COST USER EQUIPMENTS", filed on Apr. 30, 2013, which claims priority to U.S. Provisional Application No. 61/640,798, entitled METHODS AND APPARATUS FOR MANAGING CONTROL AND DATA TRANSMISSIONS FOR LOW COST USER EQUIPMENTS, filed May 1, 2012, and assigned to the assignee hereof and hereby expressly incorporated by reference herein.

FIELD

The present disclosure relates generally to communication systems, and more particularly, to a method and apparatus for managing control and data transmissions for low cost User Equipments (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a base station. The method generally includes transmitting a control channel using a first portion of resources of at least one Physical Resource Block (PRB) pair of a subframe, and providing an indication regarding whether a second portion of resources of the PRB pair not used to transmit the control channel is available for transmitting a data channel.

Certain aspects of the present disclosure provide a method for wireless communications by a user equipment. The method generally includes receiving a control channel using a first portion of resources of at least one Physical Resource Block (PRB) pair of a subframe, and receiving an indication regarding whether a second portion of resources of the PRB pair not used to transmit the control channel is available for receiving a data channel.

Certain aspects of the present disclosure provide a method for wireless communications by a base station. The method generally includes transmitting control information in a subframe of a first subset of subframes to schedule data transmissions in one or more subframes of a second subset of subframes, wherein the first subset of subframes is designated for transmitting control information without transmitting data and the second subset of subframes is designated for transmitting data without transmitting control information, and transmitting the data in the one or more subframes of the second subset in accordance with the transmitted control information.

Certain aspects of the present disclosure provide a method for wireless communications by a user equipment. The method generally includes receiving control information in a subframe of a first subset of subframes scheduling data transmissions in one or more subframes of a second subset of subframes, wherein the first subset of subframes is designated for receiving control information without receiving data and the second subset of subframes is designated for receiving data without receiving control information, and receiving the data in the one or more subframes of the second subset in accordance with the received control information.

DETAILED DESCRIPTION

Figure 1:
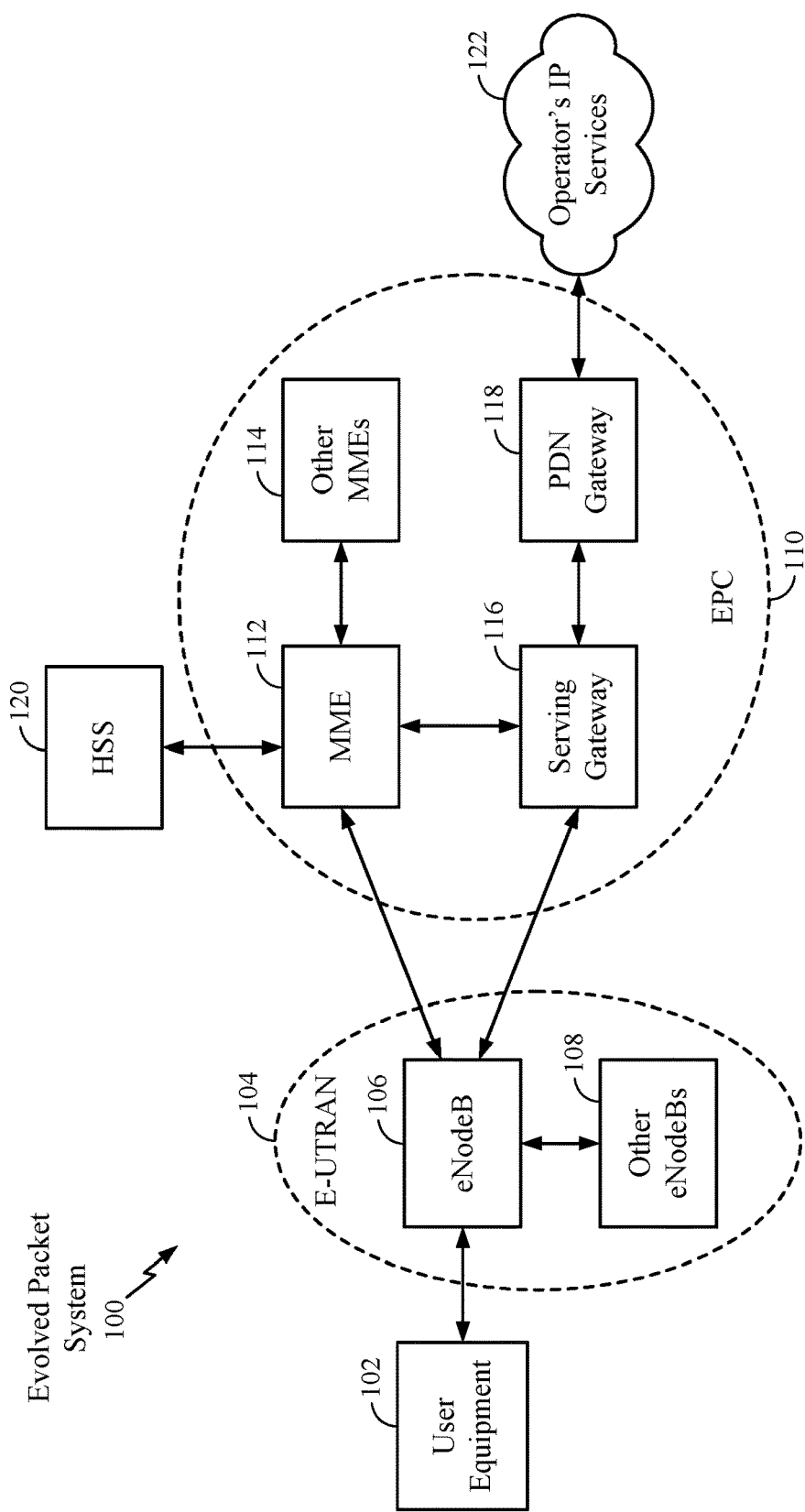
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system. LTE and LTE-Advanced are referred to generally as LTE.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS Streaming Service (PSS). In this manner, the UE 102 may be coupled to the PDN through the LTE network.

Figure 2:
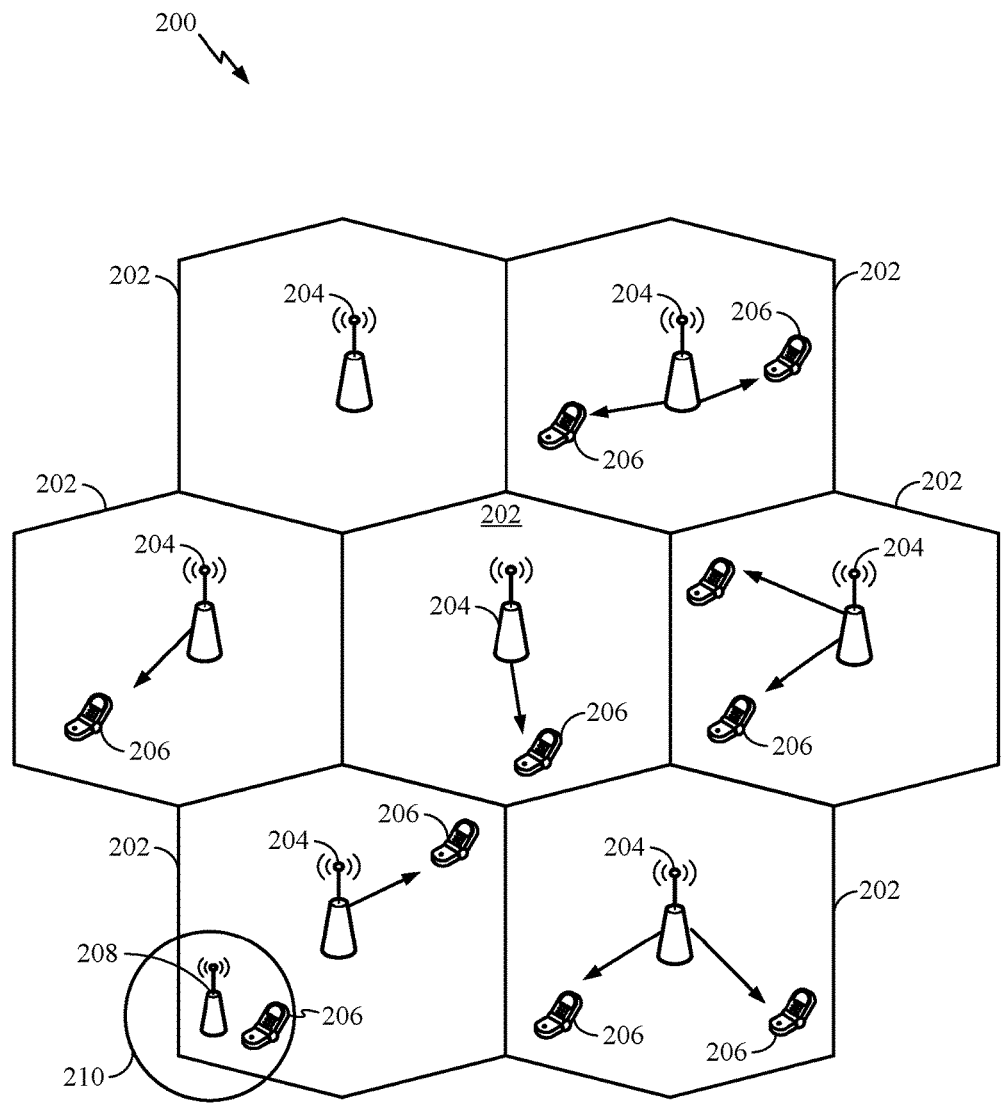
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
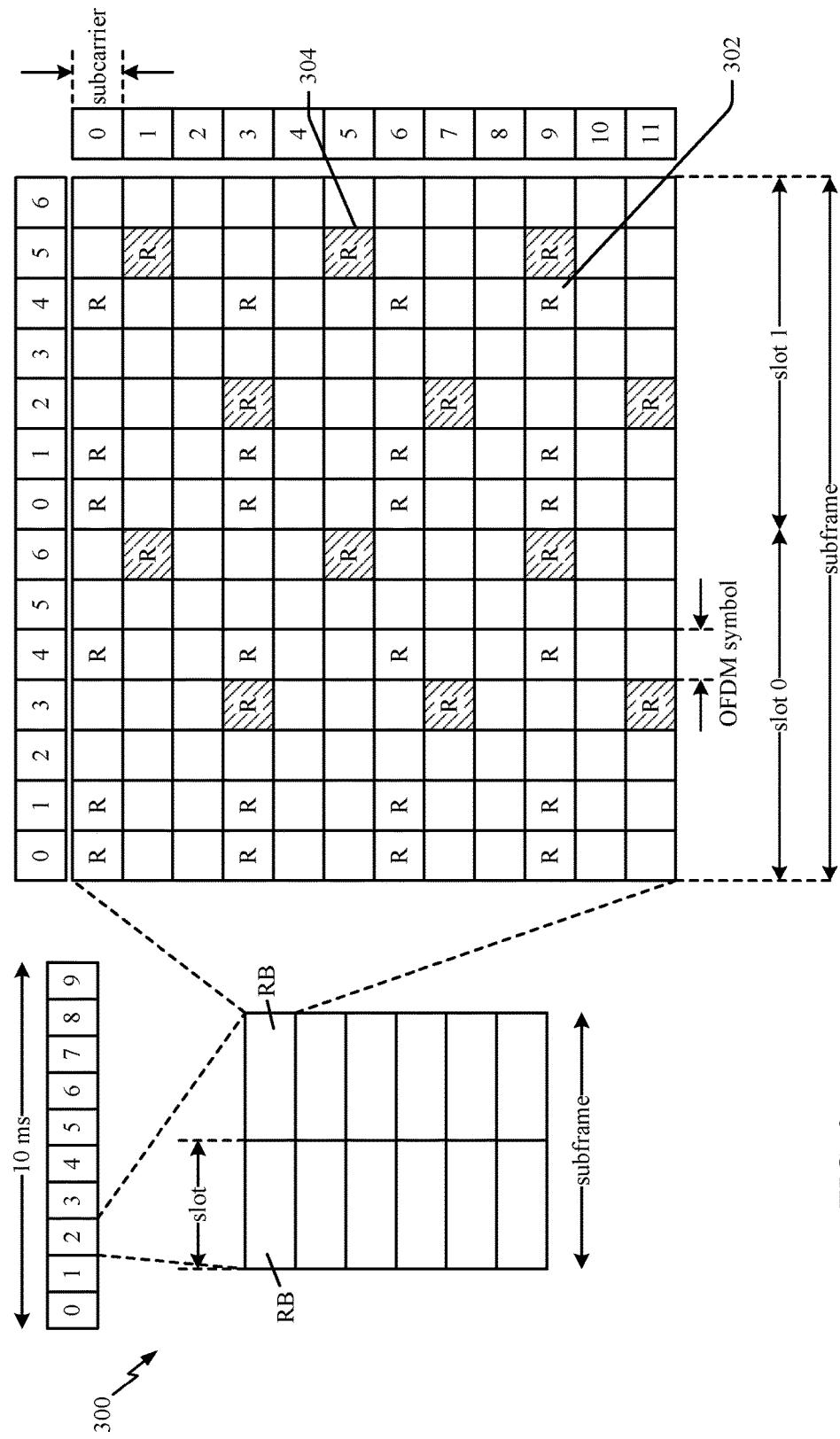
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
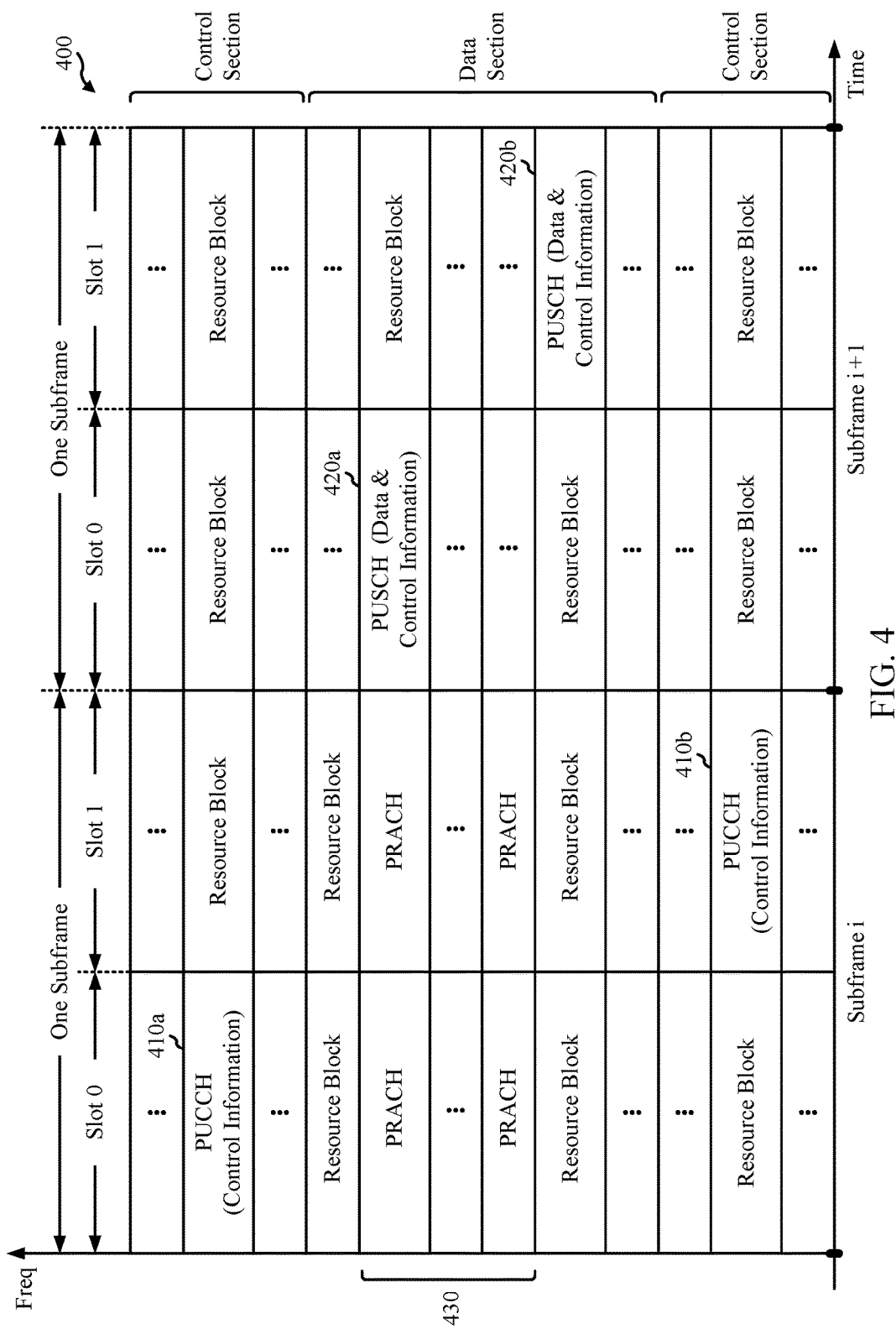
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
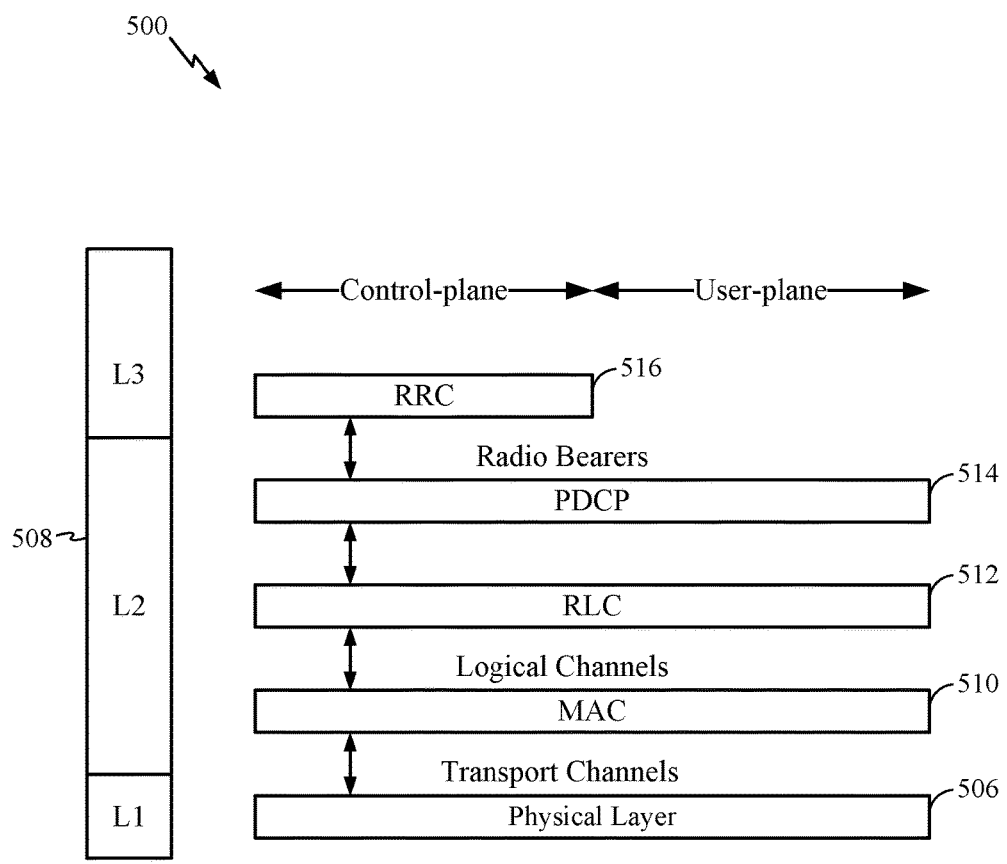
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
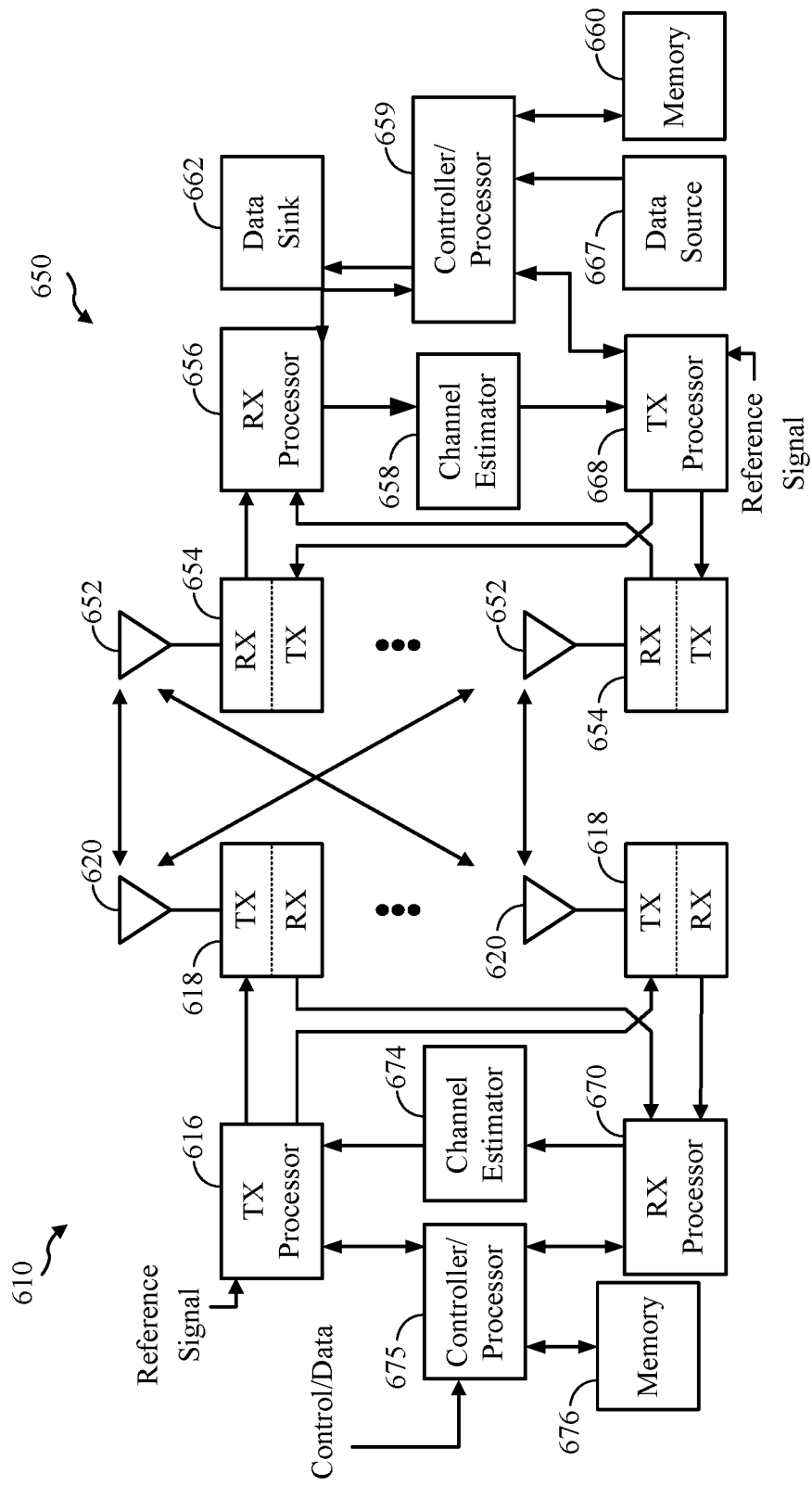
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics.

The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In certain LTE releases (e.g., LTE Rel-8/9/10), Physical Downlink Control Channel (PDCCH) is located in the first several symbols of a subframe. Generally PDCCH are fully distributed in the entire system bandwidth and are time division multiplexed (TDMed) with PDSCH. Effectively, a subframe is divided into a control region and a data region.

In LTE Rel-11 and beyond, a new control channel (e.g., enhanced PDCCH (e-PDCCH)) may be introduced. Unlike legacy PDCCH, which occupies the first several control symbols in a subframe, e-PDCCH may occupy the data region, similar to Physical Downlink Shared Channel (PDSCH). In certain aspects, e-PDCCH may help increase control channel capacity, support frequency-domain Inter Cell Interference Coordination (ICIC), achieve improved spatial reuse of control channel resource, support beamforming and/or diversity, operate on a new carrier type and in MBSFN subframes and coexist on the same carrier as legacy UEs.

In certain aspects, a new carrier type (NCT) may also be introduced in Rel-11 and beyond. In certain aspects, the NCT may not necessarily be backward compatible and may have to be associated with a backward compatible carrier as part of carrier aggregation. Such constraint may be relaxed in future LTE releases such that a carrier of the NCT may be a standalone carrier. In certain aspects, the NCT may not have the legacy control region at least in some subframes (if not all subframes) and may completely rely on the e-PDCCH for the necessary control signaling.

Figure 7:
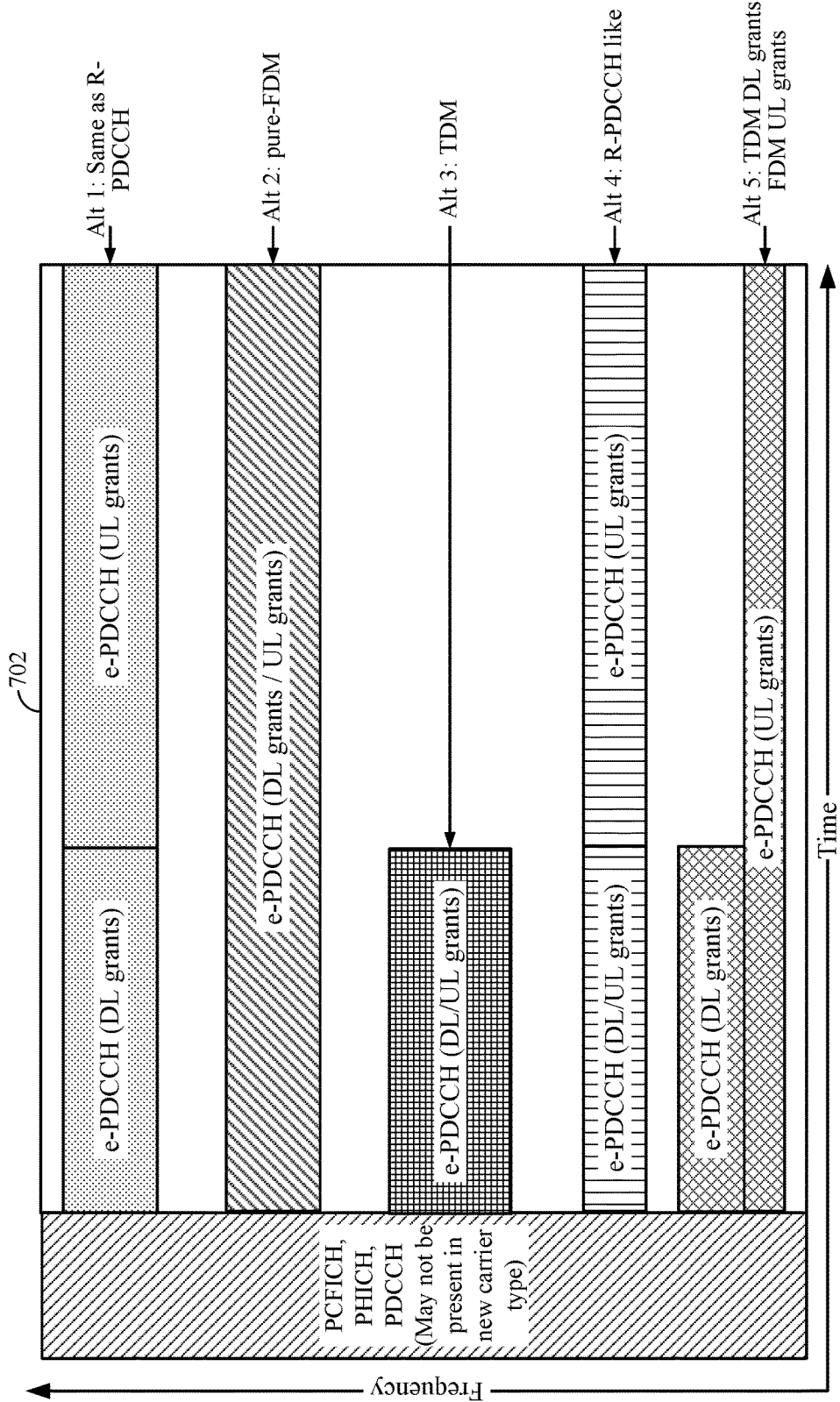
FIG. 7 illustrates possible e-PDCCH structures according to certain aspects of the present disclosure.

FIG. 7 illustrates possible e-PDCCH structures according to certain aspects of the present disclosure. 702 represents an LTE subframe. Alternative 1 (Alt 1) may include an e-PDCCH structure that is same as relay-PDCCH (R-PDCCH). Alt 2 may include a pure-frequency division multiplexed (FDMed) e-PDCCH structure with e-PDCCH spanning both first and second slots (not shown) of the subframe 702. Alt 3 may include a TDMed e-PDCCH. Alt-4 may include an e-PDCCH structure that is like R-PDCCH. Alt 5 may include TDMed DL grants and FDMed UL grants. In certain aspects, as shown in FIG. 7, PCFICH, PHICH and PDCCH may not be present in the new carrier type.

In certain aspects, a main focus of the traditional LTE design is on the improvement of spectral efficiency, ubiquitous coverage, enhanced QoS support, etc. This typically results in high end devices, such as the state-of-art smart phones, tablets, etc. However, low cost low rate devices need to be supported as well. Some market projections show that the number of low cost devices may largely exceed today's cell phones. In certain aspects, provision of low-cost MTC (machine type communications) UEs based on LTE may include one or more of reduction of maximum bandwidth, single receive RF chain, reduction of peak rate, reduction of transmit power and half duplex operation.

In certain aspects, since the intended data rate for the low cost device may be less than 100 kbps, it may be possible to operate the device only at narrowband width to reduce the cost. Two deployment scenarios for the low cost UEs may be foreseen.

One straight forward deployment scenario may be to set aside some narrow bandwidth, e.g. 1.25 MHz, to support the MTC operations. No standard changes may be necessary for such operations.

In a second scenario, low cost UEs may be operated in a large bandwidth (as other regular UEs), e.g., up to 20 MHz, and may co-exist with the regular UEs. This may not include significant standard impact, but may not be helpful in reducing cost and battery power consumption. In alternative aspects, the low cost UEs may operate with a smaller bandwidth (as discussed in certain aspects of the present disclosure below), e.g., 1.25 MHz within the large bandwidth. However, care must be taken that there is minimum spec and performance impact.

Figure 8:
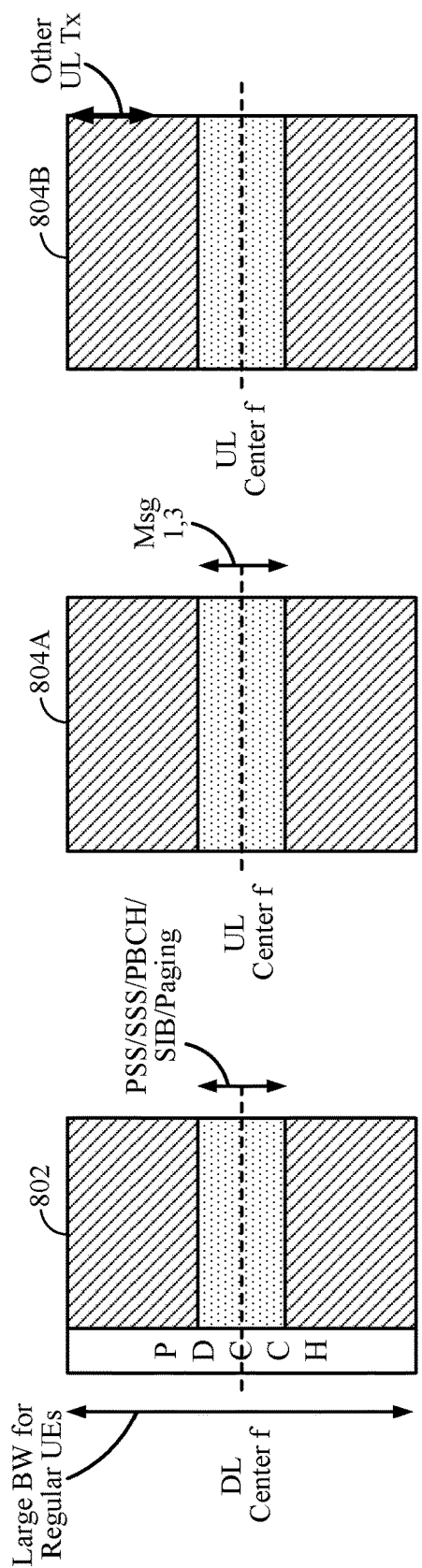
FIG. 8 illustrates narrowband operation of a UE (e.g., low cost UE) in a large bandwidth in accordance with certain aspects of the present disclosure.

FIG. 8 illustrates narrowband operation of a UE (e.g., low cost UE) within a large bandwidth in accordance with certain aspects of the present disclosure. 802 represents a downlink subframe and 804A and 804B represent an uplink subframe. In FIG. 8, the low cost UE may operate in a small bandwidth (e.g., 1.25 MHz) both on the DL and UL. Further, the small bandwidth may or may not be located in the center of the large bandwidth. As shown in the downlink subframe 802, DL for the low cost UE may be operated in the center of the large bandwidth used for DL. On the UL, as shown in the uplink subframe 804A, UL Random Access Channel (RACH) procedure (message 1 and message 3) for the low cost UE may be scheduled in the center of the large bandwidth used for the UL in order to facilitate the low cost devices to access the system. As shown in uplink subframe 804B, other UL transmissions may be in a different location of the large bandwidth. However, in certain aspects, significant standard changes may be expected with this configuration.

Figure 9:
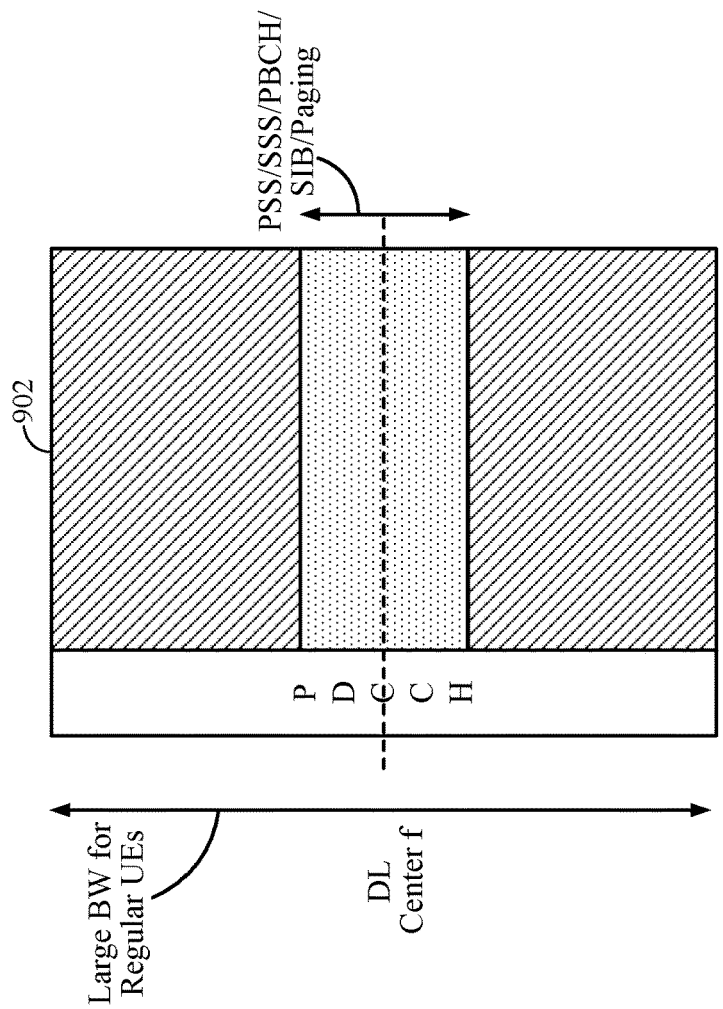
FIG. 9 illustrates narrowband DL operation and wideband UL operation of a UE (e.g., low cost UE) in accordance with certain aspects of the present disclosure.

FIG. 9 illustrates narrowband DL operation and wideband UL operation of a UE (e.g., low cost UE) in accordance with certain aspects of the present disclosure. As shown in downlink subframe 902, a low cost UE may use the center small bandwidth of the large bandwidth for the DL. Further, as shown in uplink subframe 904, the UL may operate in the entire large bandwidth. In an aspect, this configuration may have relatively lower standard impact as compared to the configuration shown in FIG. 8. In certain aspects, both operations (as shown in FIG. 8 and FIG. 9) may require ePDCCH.

In certain aspects, in a narrowband operation (e.g., 6RBs), it may be highly likely that a very limited number of UEs are scheduled within a subframe. In an aspect, each ePDCCH may use as small as 1 enhanced control channel element (eCCE) for its transmission. Each eCCE size may be comparable to 36 resource elements (REs), similar to the legacy CCE size which is fixed at 36 REs.

In certain aspects, the transmission of ePDCCH may be localized or distributed. For example, the transmission may be localized in one PRB pair or may be distributed over many PRB pairs (e.g., up to 8 PRB pairs).

In Rel-11 and beyond, multiplexing of PDSCH and ePDCCH within a PRB pair may not be permitted. Thus, in certain aspects, if control and data are scheduled to be transmitted in the same subframe, significant downlink resources may be wasted. For example, if a localized ePDCCH uses 1 eCCE within a PRB pair, assuming there are 4 eCCEs per PRB pair, ¾ of the PRB pair is wasted, or (¾)/6RBs=12.5% system resource is wasted. In another example, if a distributed ePDCCH uses 1 eCCE spanning 4 PRB pairs, assuming 4 eCCEs per PRB pair, (1 1/16) of 4 PRB pairs is wasted, or (15/16)*4/6RBs=62.5% system resource is wasted.

Thus, there is a need to more efficiently utilize resources for control and data in narrowband systems, especially for low cost UEs. As noted, the narrowband for low cost UEs may be standalone narrowband carriers, or part of a wideband carrier operation.

In certain aspects, an optimal design may depend on how many UEs are being scheduled in a subframe. More precisely, how many grants (downlink and uplink) that may possibly be transmitted in a subframe. In certain aspects, it may be important to utilize the leftover resources in a PRB pair occupied by ePDCCH for PDSCH if possible. Alternatively, the transmission of ePDCCH must not create too much fragmentation of the bandwidth, in order to minimize resource wastage.

In certain aspects, control and data may be scheduled in different subframes, such that there is no need to multiplex them in a subframe (or a PRB pair in a same subframe).

Figure 10:
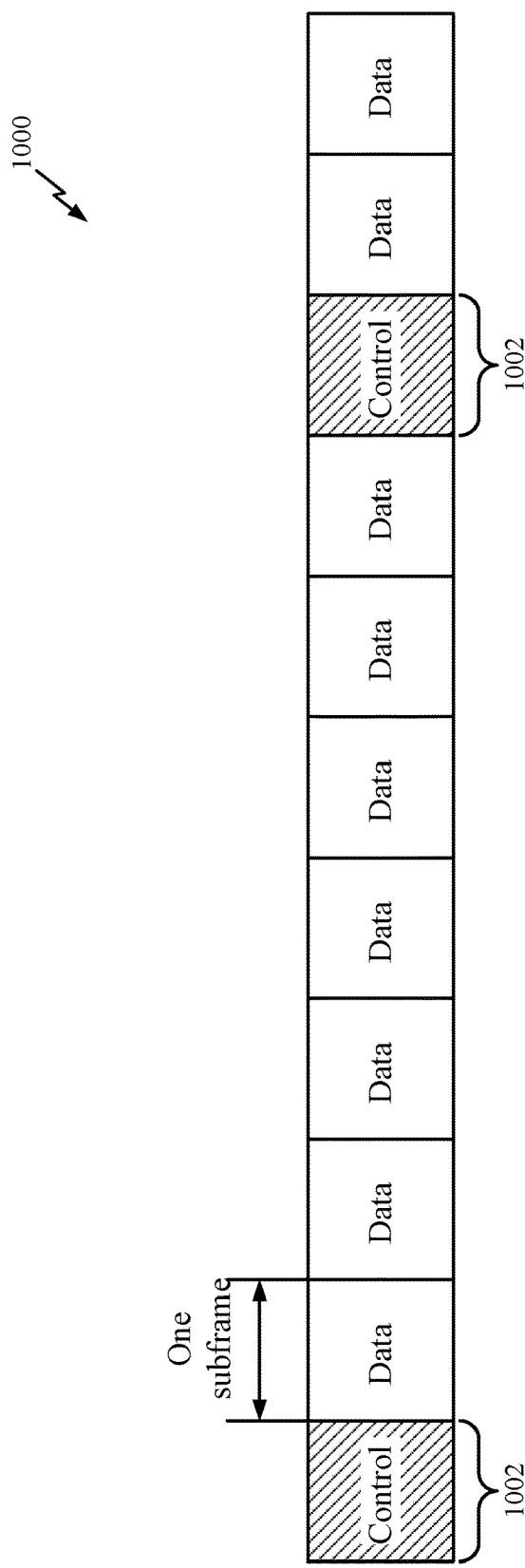
FIG. 10 illustrates TDM based control and data structure in accordance with certain aspects of the present disclosure.

FIG. 10 illustrates TDM based control and data structure 1000 in accordance with certain aspects of the present disclosure. FIG. 10 shows one example for FDD, where 1 subframe (e.g. 1002) out of 8 subframes is designed for control transmission and the rest may carry data. In certain aspects, the value "8" matches with a typical Hybrid Automatic Repeat Request (H-ARQ) Round-Trip Time (RTT) for Frequency Division Duplex (FDD). Also, the current 3-bit CIF (cross-carrier indication field) may be re-used to indicate cross-subframe scheduling.

Generally, the subframes 1002 containing control may be broadcasted to the UE or UE-specifically configured. For example, subframes 1002 may be linked with where common search space is present. In certain aspects it may not be necessary to strictly force such an operation in the system. For example, it is possible that some subframes designated as data may still occasionally carry control information.

In certain aspects, UEs not aware of such arrangement may assume legacy H-ARQ timing for both DL and UL.

Alternatively, UEs may assume that DL control are only present in a subset of subframes (anchor control subframes)—which require new H-ARQ timing.

In certain aspects, the narrowband location for control in subframes 1002 may be the same as or different from the narrowband location for data in other subframes. Additionally or separately, the narrowband location for control can be pre-determined or semi-statically determined (e.g., by higher layer configuration), while the narrowband location for data can be dynamically determined (e.g., by an indication in the control channel).

For example, for TDM based control and data structure 1000, necessary standard changes may include support for multi-subframe and/or cross-subframe scheduling, and support of new DL and UL H-ARQ timing. Benefits of the structure 1000 may include DL resource allocation for PDSCH may be in the unit of PRB pairs, and improved DL resource utilization. However, certain drawbacks of the structure 1000 may include non-trivial standard change and some H-ARQ operation impact, for example, due to increased H-ARQ scheduling timing and ACK/NAK timing.

In one aspect, whether TDM based control and data structure is used or not may depend on the bandwidth with which the UE operates. If the operation bandwidth is narrow (e.g., 6 RBs), TDM based control and data structure may be adopted. Additionally or separately, whether TDM based control and data structure is used or not may depend on the UE category. For example, the TDM structure may be adopted for low cost UE categories. A UE not belonging to the low cost category or categories may not assume the TDM structure.

In certain aspects, multiplexing of e-PDCCH and PDSCH may be allowed in one PRB pair.

Figure 11:
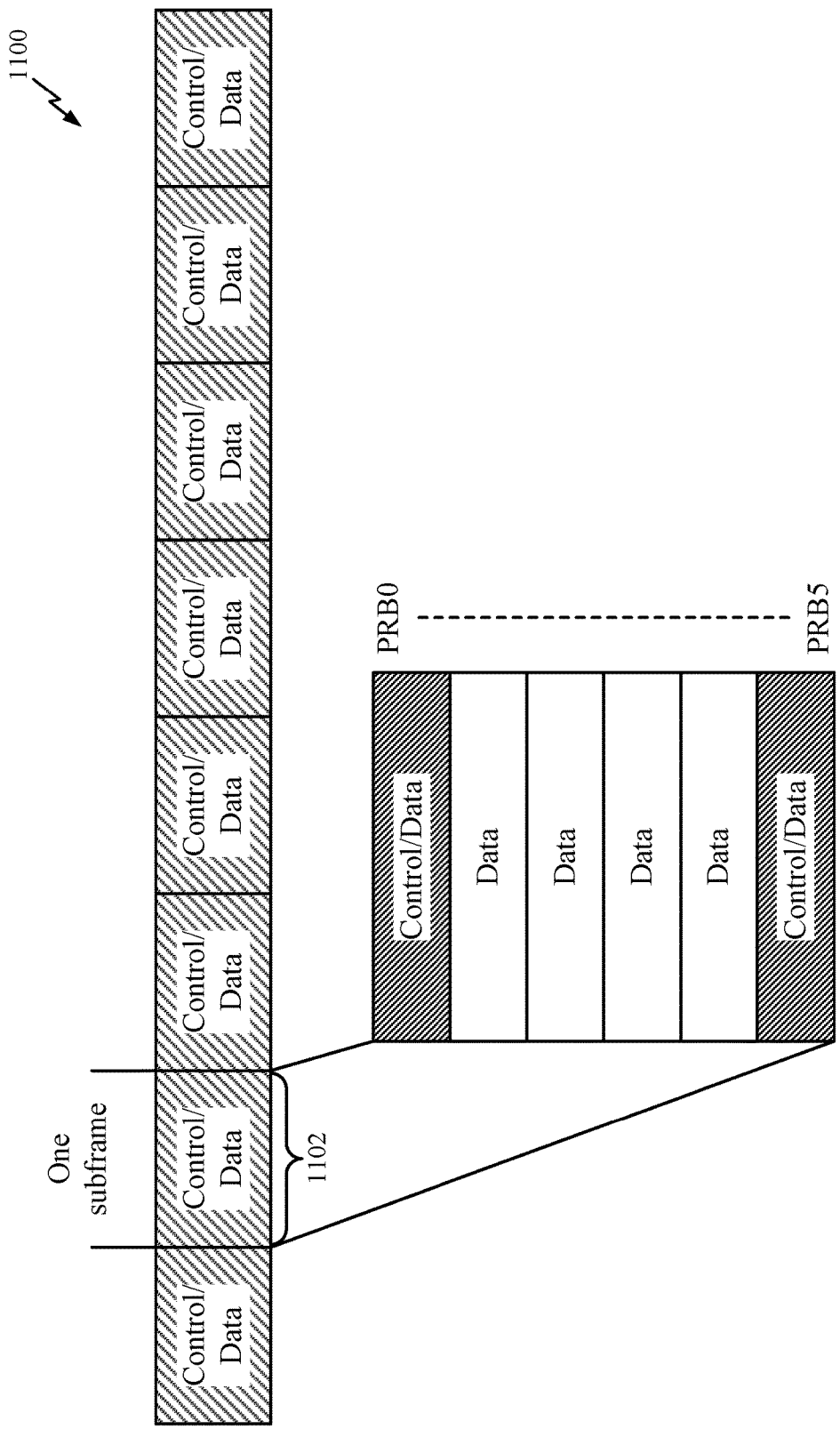
FIG. 11 illustrates a control and data structure with multiplexed e-PDCCH and PDSCH in a PRB pair in accordance with certain aspects of the present disclosure.

FIG. 11 illustrates a control and data structure 1100 with multiplexed e-PDCCH and PDSCH in a PRB pair in accordance with certain aspects of the present disclosure. Subframe 1102 includes six PRB pairs PRB0-PRB5. As shown in FIG. 11, PRB0 and PRB 5 allow multiplexing of e-PDCCH and PDSCH. A portion of resources of PRBs 0 and 5 may be used for control transmission, and the leftover resources may be used for data transmission. As shown in FIG. 11, some PRBs (e.g. PRBs 1-4) may be used for data transmission only.

In certain aspects, a UE may be signaled whether and/or how to utilize the leftover resources in the PRB pairs occupied by control information. In certain aspects, the signaling may be explicit or implicit. In implicit signaling, the UE may assume that for the detected e-PDCCH, the leftover resources in the PRB pair(s) occupied by its e-PDCCH are available for its PDSCH. This is simple but may be restrictive as the leftover resources may not be scheduled for other control information (other than e-PDCCH). In explicit signaling, a UE may be indicated whether some leftover resources are available for PDSCH or not.

In certain aspects, in a first alternative, one-bit information may be indicated in e-PDCCH to tell the UE whether or not the leftover resources in the PRB pair(s) occupied by its e-PDCCH are available for its PDSCH. As noted above, this is simple, but may be restrictive, since, e.g., there may be possibly some other grants (downlink grants, uplink grants for the same or different UEs) in the same subframe.

In a second alternative, a one-or-more bit information field may be included in e-PDCCH to tell the UE whether and which of the leftover resources in the PRB pairs(s) occupied by its ePDCCH are available for its PDSCH.

In a third alternative different resource allocation granularity may be defined for PRB pairs that may carry e-PDCCH and PRB pairs that may not carry e-PDCCH.

In certain aspects, eCCE (or eREG) may be introduced as the minimum resource granularity for ePDCCH. E.g., each PRB pairs may contain 4 eCCEs. In certain aspects, a UE may be indicated that which PRB pairs may contain ePDCCH. E.g., out of 6 PRB pairs, only 3 of them may contain ePDCCH.

In certain aspects, the resource allocation for PDSCH may be such that, for those PRB pairs that may contain e-PDCCH, a first resource allocation granularity (e.g., one eCCE (or eREG), two eCCEs (or two eREGs), etc.) is used, and for those PRB pairs that may not contain e-PDCCH, a second resource allocation granularity (e.g., PRB) may be used.

For example, a subframe may include 6 PRB pairs (PRB 0, 1, 2, 3, 4, 5 as shown in FIG. 11), and PRBs 0 and 5 may contain e-PDCCH with 4 eCCEs per PRB pair. Thus, the PDSCH resource allocation may be such that the following resources {eCCE1 of RB0, eCCE2 of RB0, eCCE3 of RB0, eCCE4 of RB0, RB1, RB2, RB3, RB4, eCCE1 of RB5, eCCE2 of RB5, eCCE3 of RB5, eCCE4 of RB5} may be addressed.

In an aspect, if bitmap signaling is used for PDSCH resource allocation, originally for 6 RBs, 6 bits may be needed. However, now we need 2×4+4=12 bits.

Alternatively, e.g., a granularity of 2 eCCEs may be the minimum resource allocation unit for PDSCH. Hence we may have {eCCE1 and eCCE 2 of RB0, eCCE3 and eCCE 4 of RB0, RB1, RB2, RB3, RB4, eCCE1 and eCCE 2 of RB5, eCCE3 and eCCE 4 of RB5}, and thus, a total of 2×2+4=8 bits if bitmap signaling may be needed.

In one aspect, whether ePDCCH and PDSCH can be multiplexed in the same PRB pair or not depends on with which bandwidth the UE operates. If the operation bandwidth is narrow (e.g., 6 RBs), multiplexing may be allowed. Additionally or separately, whether ePDCCH and PDSCH may be multiplexed in the same PRB pair or not may depend on the UE category. Multiplexing can be allowed for low cost UE categories. A UE not belonging to low cost category or categories may not assume the multiplexing operation if the UE can also operate with a large bandwidth.

In one aspect, a combination of TDM based ePDCCH and PDSCH, and multiplexing ePDCCH and PDSCH in the same PRB pair within a same subframe can be allowed simultaneously. In some subframes, only control or data is transmitted. In some other subframes, both control and data may be transmitted, where ePDCCH and PDSCH may be multiplexed in one PRB pair.

Figure 12:
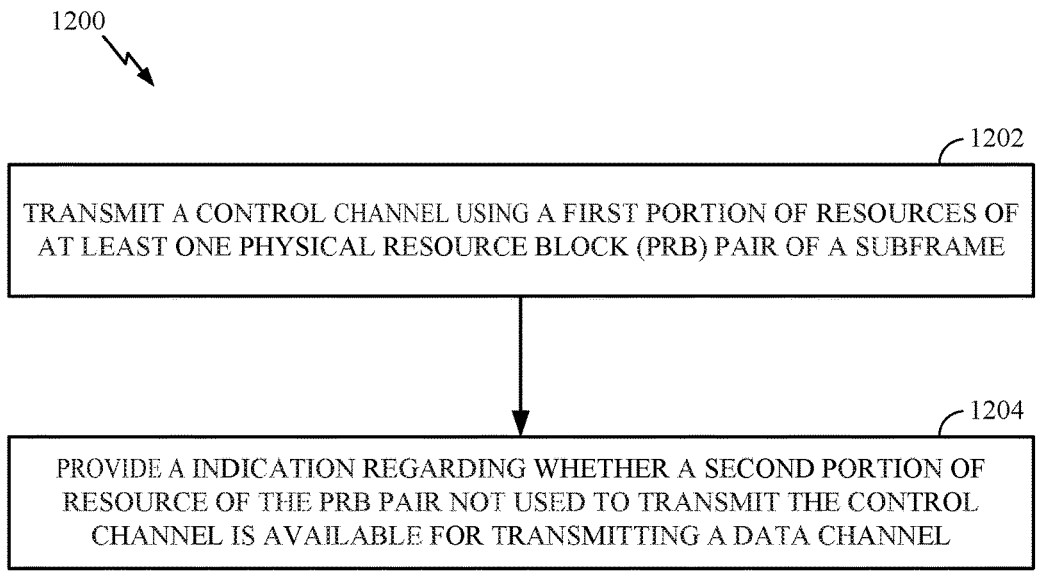
FIG. 12 shows a flow diagram illustrating operations by a base station (BS) for managing control and data transmissions according to a first example in accordance with certain aspects of the present disclosure.

FIG. 12 shows a flow diagram illustrating operations 1200 by a base station (BS) for managing control and data transmissions according to a first example in accordance with certain aspects of the present disclosure. Operations 1200 may begin, at 1202, by transmitting a control channel using a first portion of resources of at least one Physical Resource Block (PRB) pair of a subframe. At 1204, an indication may be provided regarding whether a second portion of the resources of the PRB pair not used to transmit the control channel is available for transmitting a data channel.

In an aspect, the subframe may include an LTE subframe, the control channel may include e-PDCCH, and the data channel may include PDSCH.

In certain aspects, the indication may include one or more bits in the control channel. In an aspect, the one or more bits may include a single bit indicating whether or not the second portion of the resources is available for transmitting the data channel. In an aspect, the one or more bits may include multiple bits indicating which resources of the second portion of resources are available for transmitting the data channel. In an aspect, the one or more bits may indicate a subset of PRB pairs that are available for transmitting a control channel.

In certain aspects, a first resource allocation granularity may be used for allocating data channel resources of PRB pairs that are available for transmitting a control channel, and a second resource allocation granularity may be used for allocating data channel resources of PRB pairs that are not available for transmitting a control channel. In an aspect, the first resource allocation granularity may include an integer number of one or more CCEs, and the second resource allocation granularity may include an integer number of one or more PRBs.

In certain aspects, a bandwidth occupied by the control channel and the corresponding data channel may be at or below a threshold, wherein the threshold may be six resource blocks.

Figure 13:
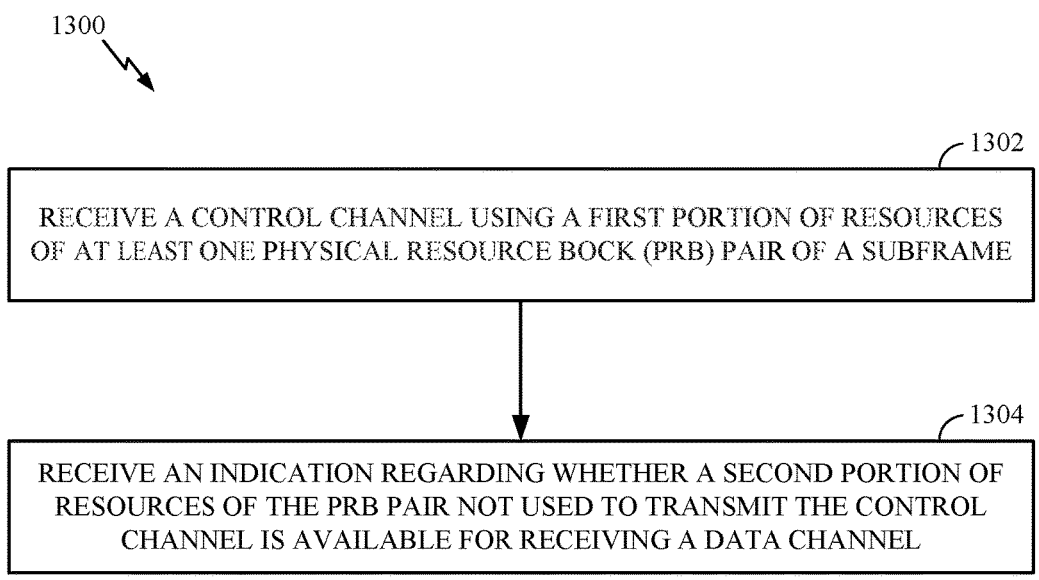
FIG. 13 shows a flow diagram illustrating operations by a user equipment (UE) for managing control and data transmissions according to a first example in accordance with certain aspects of the present disclosure.

FIG. 13 shows a flow diagram illustrating operations 1300 by a user equipment (e.g., a low cost UE) for managing control and data transmissions according to a first example in accordance with certain aspects of the present disclosure. Operations 1300 may begin, at 1302, by receiving a control channel using a first portion of resources of at least one Physical Resource Block (PRB) pair of a subframe. At 1304, an indication may be received regarding whether a second portion of resources of the PRB pair not used to transmit the control channel is available for receiving a data channel.

In an aspect, the subframe may include an LTE subframe, the control channel may include e-PDCCH, and the data channel may include PDSCH.

In certain aspects, the indication may include one or more bits in the control channel. In an aspect, the one or more bits may include a single bit indicating whether or not the second portion of the resources is available for receiving the data channel. In an aspect, the one or more bits may include multiple bits indicating which resources of the second portion of resources are available for receiving the data channel. In an aspect, the one or more bits may indicate a subset of PRB pairs that are available for receiving a control channel.

In certain aspects, a first resource allocation granularity may be used for allocating data channel resources of PRB pairs that are available for receiving a control channel, and a second resource allocation granularity may be used for allocating data channel resources of PRB pairs that are not available for receiving a control channel. In an aspect, the first resource allocation granularity may include an integer number of one or more CCEs, and the second resource allocation granularity may include an integer number of one or more PRBs.

In certain aspects, a bandwidth occupied by the control channel and the corresponding data channel may be at or below a threshold, wherein the threshold may be six resource blocks.

Figure 14:
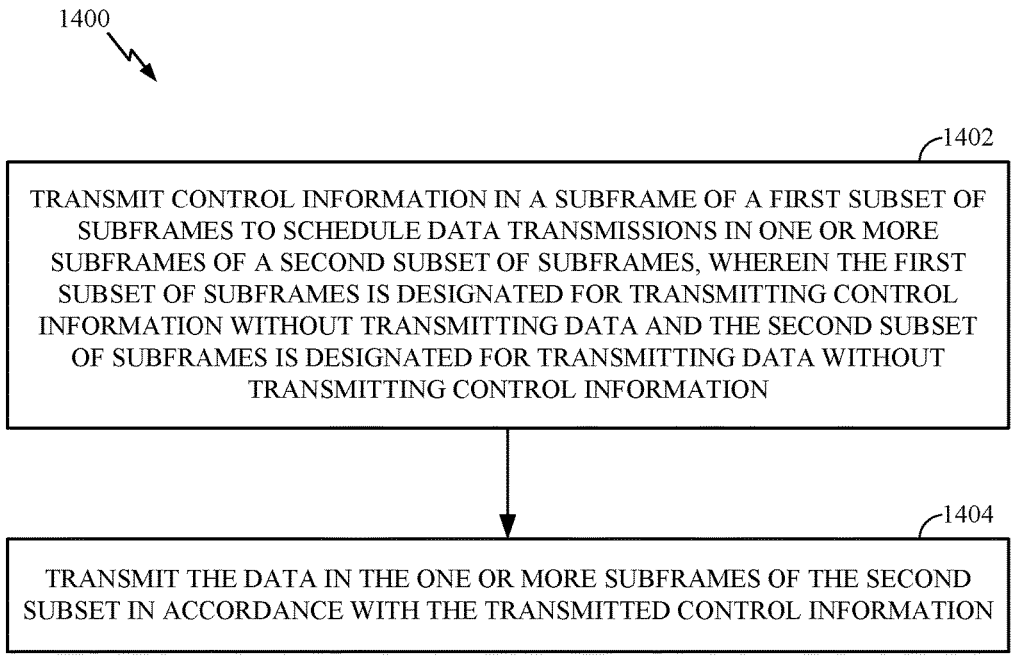
FIG. 14 shows a flow diagram illustrating operations by a base station (BS) for managing control and data transmissions according to a second example in accordance with certain aspects of the present disclosure.

FIG. 14 shows a flow diagram illustrating operations 1400 by a base station (BS) for managing control and data transmissions according to a second example in accordance with certain aspects of the present disclosure. Operations 1400 may begin, at 1402, by transmitting control information in a subframe of a first subset of subframes to schedule data transmissions in one or more subframes of a second subset of subframes, wherein the first subset of subframes is designated for transmitting control information without transmitting data and the second subset of subframes is designated for transmitting data without transmitting control information. At 1404, the data may be transmitted in the one or more subframes of the second subset in accordance with the transmitted control information.

In certain aspects, operations 1400 may further include providing an indication of which subframes belong in the first subset, wherein the indication may be broadcasted.

In certain aspects, which subframes belong in the first subset may be linked to a common search space location.

In an aspect, the control information may schedule data transmissions via a cross-carrier indication (CIF) field. In an aspect, the control information may be transmitted in an e-PDCCH.

In certain aspects, operations 1400 may further include transmitting control information in a subframe of the second subset.

In certain aspects, the bandwidth occupied by a control channel carrying the control information or a corresponding data channel carrying the data may be at or below a threshold. In an aspect, the threshold may be six resource blocks.

In certain aspects, a bandwidth location for a control channel carrying the control information may be semi-statically determined, and the bandwidth location for a data channel carrying the data may be dynamically determined.

Figure 15:
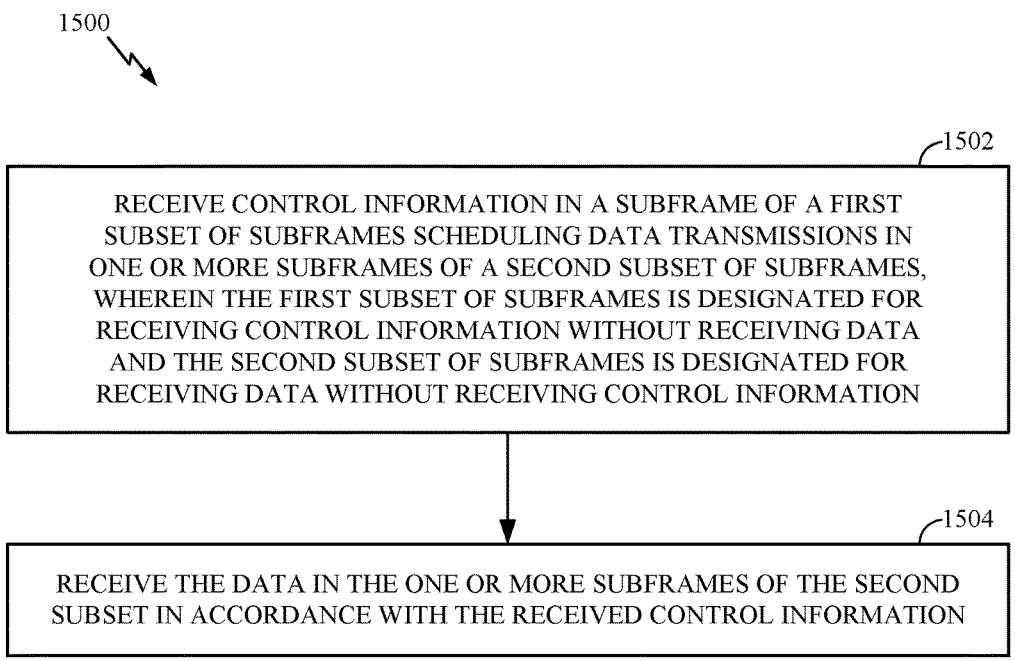
FIG. 15 shows a flow diagram illustrating operations by a user equipment (UE) for managing control and data transmissions according to a second example in accordance with certain aspects of the present disclosure.

FIG. 15 shows a flow diagram illustrating operations 1500 by a user equipment (e.g., low cost UE) for managing control and data transmissions according to a second example in accordance with certain aspects of the present disclosure. Operations 1500 may begin, at 1502, by receiving control information in a subframe of a first subset of subframes scheduling data transmissions in one or more subframes of a second subset of subframes, wherein the first subset of subframes is designated for receiving control information without receiving data and the second subset of subframes is designated for receiving data without receiving control information. At 1504, the data may be received in the one or more subframes of the second subset in accordance with the received control information.

In certain aspects, operations 1500 may further include receiving an indication of which subframes belong in the first subset, wherein the indication may be broadcasted.

In certain aspects, which subframes belong in the first subset may be linked to a common search space location.

In certain aspects, the control information may schedule data transmissions via a CIF field. In an aspect, the control information may be received in an e-PDCCH.

In certain aspects, operations 1500 may further include receiving control information in a subframe of the second subset.

In certain aspects, a bandwidth occupied by a control channel carrying the control information or a corresponding data channel carrying the data may be at or below a threshold. In an aspect, the threshold may be six resource blocks.

In certain aspects, a bandwidth location for a control channel carrying the control information may be semi-statically determined, and the bandwidth location for a data channel carrying the data may be dynamically determined.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as means plus function unless the element is expressly recited using the phrase "means for."

What is claimed is:

1. A method of wireless communications by a base station (BS), comprising:
   transmitting control information in a subframe of a first subset of subframes to schedule data transmissions in one or more subframes of a second subset of subframes, wherein the first subset of subframes is designated for transmitting control information without transmitting data and the second subset of subframes is designated for transmitting data without transmitting control information;
   providing an indication of subframes that are included in the first subset and are designated for transmitting control information without transmitting data; and
   transmitting the data in the one or more subframes of the second subset in accordance with the transmitted control information.

2. The method of claim 1, wherein the indication is broadcast.

3. The method of claim 1, wherein the subframes included in the first subset are linked to a common search space location.

4. The method of claim 1, wherein the control information schedules data transmissions via a cross-carrier indication field (CIF).

5. The method of claim 1, wherein the control information is transmitted in an enhanced Physical Downlink Control Channel (e-PDCCH).

6. The method of claim 1, wherein a bandwidth occupied by a control channel carrying the control information or a corresponding data channel carrying the data is at or below a threshold.

7. The method of claim 6, wherein the threshold is six resource blocks.

8. The method of claim 1, wherein a bandwidth location for a control channel carrying the control information is semi-statically determined, and the bandwidth location for a data channel carrying the data is dynamically determined.

9. An apparatus for wireless communications by a base station (BS), comprising:
   means for transmitting control information in a subframe of a first subset of subframes to schedule data transmissions in one or more subframes of a second subset of subframes, wherein the first subset of subframes is designated for transmitting control information without transmitting data and the second subset of subframes is designated for transmitting data without transmitting control information;
   means for providing an indication of subframes that are included in the first subset and are designated for receiving control information without receiving data; and
   means for transmitting the data in the one or more subframes of the second subset in accordance with the transmitted control information.

10. The apparatus of claim 9, wherein the indication is broadcast.

11. The apparatus of claim 9, wherein the subframes included in the first subset are linked to a common search space location.

12. The apparatus of claim 9, wherein the control information schedules data transmissions via a cross-carrier indication field (CIF).

13. The apparatus of claim 9, wherein the control information is transmitted in an enhanced Physical Downlink Control Channel (e-PDCCH).

14. The apparatus of claim 9, wherein a bandwidth occupied by a control channel carrying the control information or a corresponding data channel carrying the data is at or below a threshold.

15. The apparatus of claim 14, wherein the threshold is six resource blocks.

16. The apparatus of claim 9, wherein a bandwidth location for a control channel carrying the control information is semi-statically determined, and the bandwidth location for a data channel carrying the data is dynamically determined.

17. An apparatus for wireless communication, comprising:
   at least one processor configured to:
      transmit control information in a subframe of a first subset of subframes to schedule data transmissions in one or more subframes of a second subset of subframes, wherein the first subset of subframes is designated for transmitting control information without transmitting data and the second subset of subframes is designated for transmitting data without transmitting control information;
      provide an indication of subframes that are included in the first subset and are designated for receiving control information without receiving data; and
      transmit the data in the one or more subframes of the second subset in accordance with the transmitted control information; and
   a memory coupled to the at least one processor.

18. A computer program product for wireless communication, comprising:
   a non-transitory computer-readable medium comprising code for:

transmitting control information in a subframe of a first subset of subframes to schedule data transmissions in one or more subframes of a second subset of subframes, wherein the first subset of subframes is designated for transmitting control information without transmitting data and the second subset of subframes is designated for transmitting data without transmitting control information;

providing an indication of subframes that are included in the first subset and are designated for receiving control information without receiving data; and transmitting the data in the one or more subframes of the second subset in accordance with the transmitted control information.

19. A method of wireless communications by a user equipment (UE), comprising:

receiving control information in a subframe of a first subset of subframes scheduling data transmissions in one or more subframes of a second subset of subframes, wherein the first subset of subframes is designated for receiving control information without receiving data and the second subset of subframes is designated for receiving data without receiving control information;

receiving an indication of subframes that are included in the first subset and are designated for receiving control information without receiving data; and receiving the data in the one or more subframes of the second subset in accordance with the received control information.

20. The method of claim 19, wherein the indication is broadcast.

21. The method of claim 19, wherein the subframes included in the first subset are linked to a common search space location.

22. The method of claim 19, wherein the control information schedules data transmissions via a cross-carrier indication field (CIF).

23. The method of claim 19, wherein the control information is received in an enhanced Physical Downlink Control Channel (e-PDCCH).

24. The method of claim 19, wherein a bandwidth occupied by a control channel carrying the control information or a corresponding data channel carrying the data is at or below a threshold.

25. The method of claim 24, wherein the threshold is six resource blocks.

26. The method of claim 19, wherein a bandwidth location for a control channel carrying the control information is semi-statically determined, and the bandwidth location for a data channel carrying the data is dynamically determined.

27. An apparatus for wireless communications by a user equipment (UE), comprising:

means for receiving control information in a subframe of a first subset of subframes scheduling data transmissions in one or more subframes of a second subset of subframes, wherein the first subset of subframes is designated for receiving control information without receiving data and the second subset of subframes is designated for receiving data without receiving control information;

means for receiving an indication of subframes that are included in the first subset and are designated for receiving control information without receiving data; and means for receiving the data in the one or more subframes of the second subset in accordance with the received control information.

28. The apparatus of claim 27, wherein the indication is broadcast.

29. The apparatus of claim 27, wherein the subframes included in the first subset are linked to a common search space location.

30. The apparatus of claim 27, wherein the control information schedules data transmissions via a cross-carrier indication field (CIF).

31. The apparatus of claim 27, wherein the control information is received in an enhanced Physical Downlink Control Channel (e-PDCCH).

32. The apparatus of claim 27, wherein a bandwidth occupied by a control channel carrying the control information or a corresponding data channel carrying the data is at or below a threshold.

33. The apparatus of claim 32, wherein the threshold is six resource blocks.

34. The apparatus of claim 27, wherein a bandwidth location for a control channel carrying the control information is semi-statically determined, and the bandwidth location for a data channel carrying the data is dynamically determined.

35. An apparatus for wireless communication, comprising:

at least one processor configured to:
receive control information in a subframe of a first subset of subframes scheduling data transmissions in one or more subframes of a second subset of subframes, wherein the first subset of subframes is designated for receiving control information without receiving data and the second subset of subframes is designated for receiving data without receiving control information;

receive an indication of subframes that are included in the first subset and are designated for receiving control information without receiving data; and receive the data in the one or more subframes of the second subset in accordance with the received control information; and a memory coupled to the at least one processor.

36. A computer program product for wireless communication, comprising:

a non-transitory computer-readable medium comprising code for:

receiving control information in a subframe of a first subset of subframes scheduling data transmissions in one or more subframes of a second subset of subframes, wherein the first subset of subframes is designated for receiving control information without receiving data and the second subset of subframes is designated for receiving data without receiving control information;

receiving an indication of subframes that are included in the first subset and are designated for receiving control information without receiving data; and receiving the data in the one or more subframes of the second subset in accordance with the received control information.

* * * * *